Jan. 4, 1966    R. J. GREAVES    3,227,108
PALLET OR STILLAGE
Filed Aug. 3, 1964    2 Sheets-Sheet 1
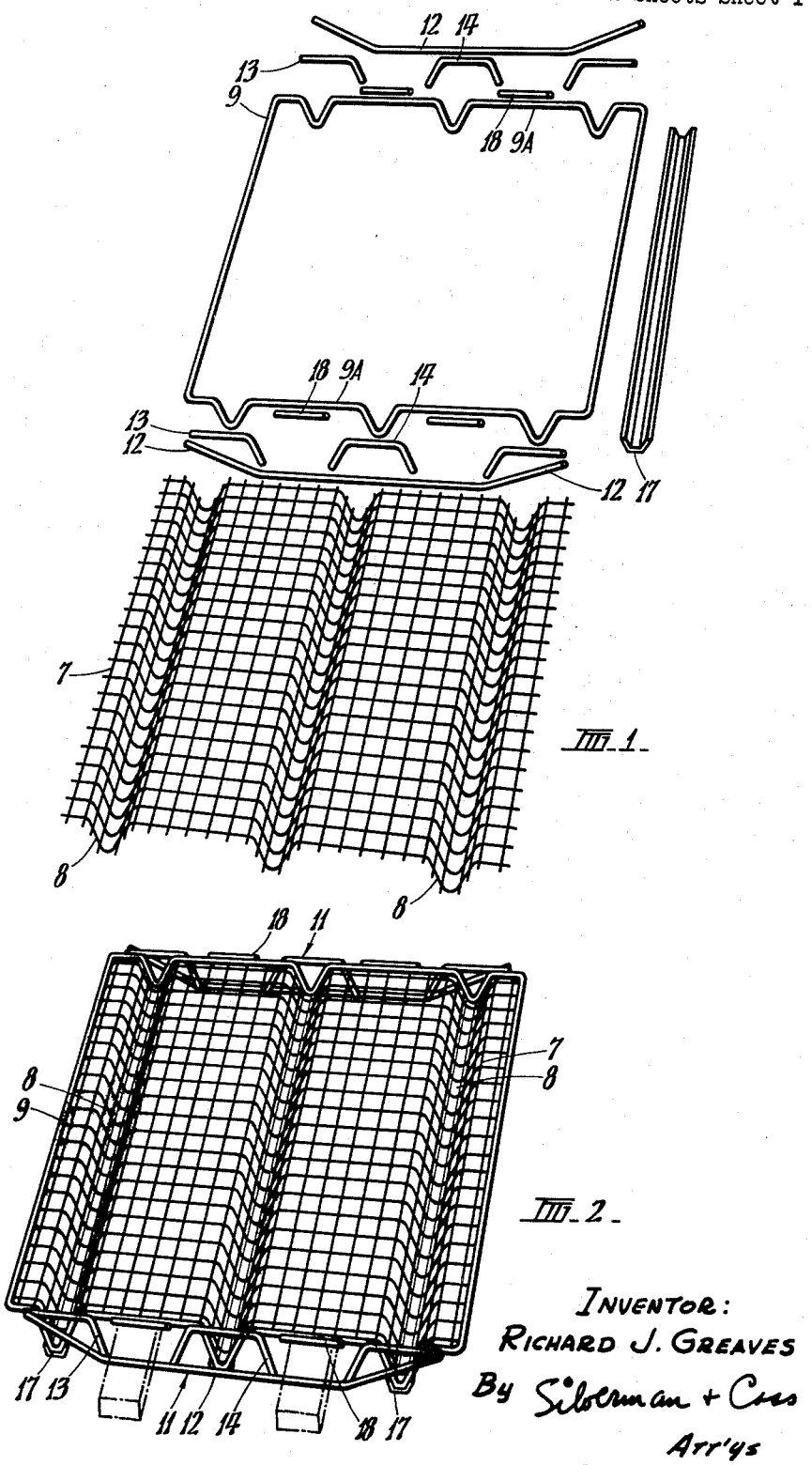
INVENTOR:
RICHARD J. GREAVES
By Silverman + Cass
Att'ys

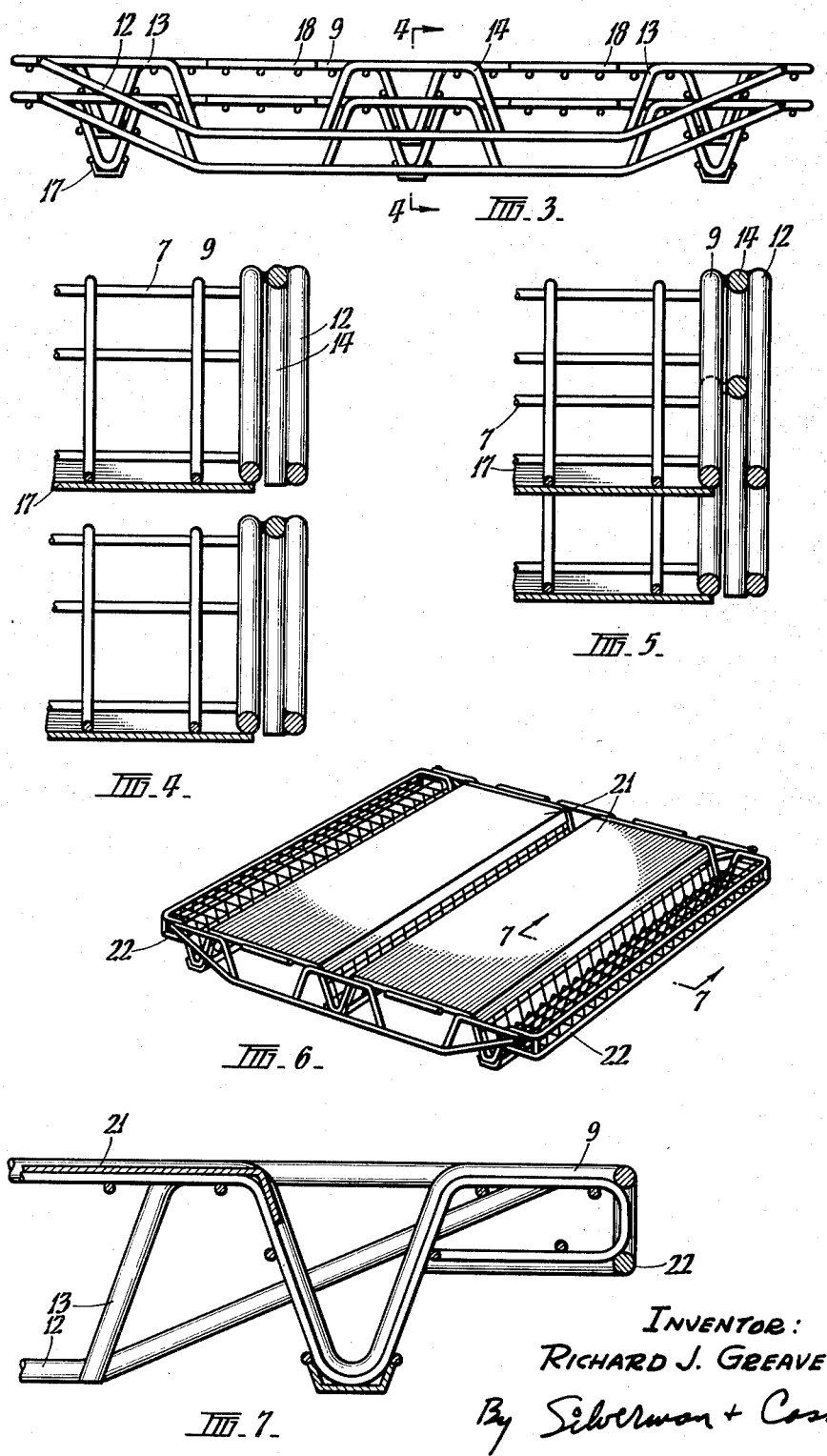

United States Patent Office 3,227,108
Patented Jan. 4, 1966

3,227,108
PALLET OR STILLAGE
Richard Johnson Greaves, 150 Balcombe Road,
Mentone, Victoria, Australia
Filed Aug. 3, 1964, Ser. No. 387,076
6 Claims. (Cl. 108—53)

This invention relates to mechanical handling equipment and in particular to load carrying platforms or trays such as pallets or stillages (hereinafter called "pallets") which are used in the storing and handling of goods.

Presently used pallets are generally made from wood and whilst generally satisfactory in use, they suffer from disadvantages in that they can be easily broken, especially when sudden impact loads are applied thereto, are worn out quickly, and are relatively heavy and bulky to store. These standard pallets are not nestable and when stacked one above the other, they occupy a space equivalent to their aggregate height. This is usually very uneconomical, since a large amount of storage space may be thus ungainfully occupied.

It is accordingly the main object of this invention to provide a lightweight nestable pallet from a material which is more resistant to wear and impact loading than timber. Another object of the invention is to provide a pallet which is so constructed that it may be capable of supporting its load in a stable manner under several different conditions of support, such as when lifted by the forks of a lifting device, when resting on a flat surface such as a floor, when supported in a pallet truck either by the wings of the pallet or by its outer ribs or legs, and when resting on an uneven surface. Other aims and objects of the invention will become apparent as the ensuing description proceeds.

According to the invention there is provided a pallet which has a load bearing tray formed of a continuous fabric and support frames rigidly attached to the fabric along at least two mutually opposite edges of the load bearing tray, said support frames comprising upper and lower chord elements and bracing elements extending between them wherein the lower chord element is laterally offset from the bracing elements whereby the pallet can be nested with another identical pallet. Preferably the tray is square in plan and is provided with a plurality of strengthening ribs constituted by mutually parallel open and generally V-shaped folds in the fabric. Preferably too, the fabric is of steel wire mesh.

The support frames for the pallet may be constituted by trusses made of steel rods or like elements which are rigidly welded together and to two sides or edges of a wire mesh tray. The pallet is so designed that the tray will be in direct contact with the load carried by the pallet. This load induces mainly tensile stresses in the wires of the mesh and these stresses are transferred into the end frames which resist the load and transfer it to any supporting surface or structure on which the pallet rests. In cases where the ribs of the tray rest on the supporting surface, a portion of the load may also be transferred to the supporting surface by virtue of compression in the vertical wires of the ribs.

In order that the invention may be more fully explained, two embodiments thereof will now be described with reference to the accompanying drawings in which:

FIGURE 1 is an exploded perspective view of a pallet according to the invention;

FIGURE 2 is a perspective view of an assembled pallet of the type illustrated in FIGURE 1;

FIGURE 3 is an end elevation of two pallets of the type illustrated in FIGURE 2 nested one within the other;

FIGURE 4 is part of a cross-section on the line 4—4 in which, however, the two pallets are shown separated;

FIGURE 5 is part of a true cross-section on the line 4—4 in FIGURE 3;

FIGURE 6 is a perspective view of a pallet similar to that shown in the preceding figures but incorporating a number of modifications; and FIGURE 7 is a cross-section on the line 7—7 in FIGURE 6.

The pallet illustrated in FIGURES 1 to 5 is adapted to carry a load of one ton and may be used in general handling, storage and loading operations for a large range of goods. The pallet comprises a 44 inch square tray 7 cut from 8 gauge wire mesh of two inch square mesh size and formed with three parallel generally V-shaped folds 8 which serve as strengthening ribs. A frame 9 of 3/8" diameter steel rod extends around the entire periphery of tray 7 and is welded to the wire mesh thereof. Parts 9A of frame 9 serve as elements of a pair of support frames 11 extending along two mutually opposite edges of tray 7.

Each support frame 11 is the form of a composite truss having an upper chord constituted by parts 9A of frame 9 and the horizontal legs of a pair of members 13 and a member 14, a bottom chord provided by a member 12, and bracing members formed by the sloping legs of members 13, 14. Members 12, 13, 14 are welded to frame 9 to form the composite truss. As is most clearly shown in FIGURES 2 and 4, members 13, 14 are offset from frame 9 laterally outwardly of the pallet and member 12 is offset from members 13, 14 in the same direction. Because of this particular construction of the support frames 11, the pallet can be nested with another identical pallet as shown in FIGURES 3 and 5. Thus when one pallet is lowered on to another, its lower chord members 12 pass outside the members 13, 14 of the lower pallet and its end members 13, 14 fit snugly within the members 13, 14 of the lower pallet.

Three load distributing or reinforcing channels 17 are welded to the lower edges of ribs 8 and, at their ends, to frame 9. The lower edges of ribs 8 are flush with the lower edges of support frames 11 so that reinforcing channels 17 project below the lower chords of the support frames to the extent of their web thickness. When the loaded pallet rests on a level surface, reinforcing channels 17 distribute the load of the pallet between the ribs which is especially useful if the pallet has been overstacked. Furthermore these channels allow the pallet to be readily supported in a pallet rack and can also serve as runners by means of which the pallet may be conveyed over roller or wheel conveyors. In use of the pallet, the forks of a fork lift truck may be inserted through an end member 11 and between the reinforcing ribs 8 of tray 7 as indicated by the dotted lines in FIGURE 2 and rods 18 are welded to frame 9 in order to provide reinforcing at those points at which the pallet will be supported by the forks.

In use of the above described pallet it is found that the interplay between the tensile and compressive stresses in the wires of tray 7 and the tensile, compressive and torsional stresses which are set up in end frames 11 enables the pallet to absorb shock forces without suffering permanent deformation or damage. However, while the torsional stability of the pallet as a whole will usually prevent permanent deformation by twisting or racking of the whole pallet when resting on rough or very uneven support or storage surfaces, the pallet will nevertheless deform slightly in an elastic manner when it rests under load on a surface which is not quite smooth.

Frame 9 projects slightly above the level of tray 7 to form a retaining ledge which assists in preventing loads slipping from the tray. If required, this retaining ledge may be utilized to retain and locate an insert of plywood, masonite or any other sheet material placed upon the tray to provide a solid base surface for loads which might otherwise slip through or foul the mesh of the tray. If the pallet is to be used continuously for transferring loads which might foul a mesh tray, for example articles with pedestal feet or other similar projections, it may be permanently adapted to provide a solid base surface by welding sheet steel platform members 21 to the tray as shown in FIGURES 6 and 7. These figures also show a further modification by which the "free" edges of the pallet extending parallel to the ribs 8 have been strengthened by provided lower chord members 22 and returning and welding the wire mesh of tray 7 to form box-shaped edge-reinforcing trusses. This latter modification may be made to pallets in applications where high edge loading is likely.

The above described pallets are of relatively simple but sturdy welded construction. Their strength to weight ratio is extremely high and the pallet illustrated in FIGURES 1 to 5 which has been designed to carry a load of one ton weighs approximately twenty-seven pounds. Virtually no maintenance is required on these pallets, but if desired, they may be finished by plating, painting, or covered by a coating of a plastic, rubber or any other similar material in order to provide a desired surface finish and to protect the steel wires and rods against corrosion and rusting. The size and shape of the pallets may be varied in accordance with the loads which have to be carried. The size and gauge of the wire mesh for the tray can also be varied to suit any particular application, and the reinforcement can be modified in accordance with the loads in which the pallet is intended to carry in use.

It is to be understood that the materials and constructional details of the particular embodiments of the invention which have been illustrated and described herein are not to be construed as limiting the scope of the invention, since many variations are possible which are within the spirit of the invention here disclosed. Thus, instead of a fabric of steel wire it would be possible to use sheet steel, expanded metal, woven wire, fibre glass, laminated timber or any other fabric provided that it is capable of carrying the requisite loads. The support frames may be made from metal bars of other than circular cross-section, such as angle iron, channel sections and the like or may even be moulded from fibre glass or like material or made from laminated timber. Welding was described as the method of connecting the supporting end frames to the fabric, but it is to be understood that riveting or bolting could also be used.

I claim:

1. A pallet comprising a load bearing tray formed of a continuous fabric and support frames rigidly attached to the fabric along at least two mutually opposite edges of the load bearing tray, said support frames comprising upper and lower chord elements and bracing elements extending between them wherein the lower chord element is laterally offset from the bracing elements whereby the pallet can be nested with an identical pallet.

2. A pallet as claimed in claim 1 in which the fabric is of wire mesh.

3. A pallet comprising a load bearing tray formed of a continuous wire mesh fabric and support frames supporting said fabric, said support frames being constituted by trusses at two opposite ends of the tray, said trusses comprising upper chord elements secured to the fabric, bracing elements secured to and offset laterally outwardly from the upper chord elements, and lower chord elements secured to and offset laterally outwardly from the bracing elements whereby the pallet may be nested with an identical pallet.

4. A pallet as claimed in claim 3 in which the fabric is bounded by a peripheral frame, portions of which constitute at least part of the said upper chord elements.

5. A pallet as claimed in claim 3 in which the fabric is provided with strengthening ribs constituted by mutually parallel open and generally V-shaped folds in the fabric.

6. A pallet as claimed in claim 5 in which each of said folds has secured to its lower end a channel shaped member which extends longitudinally of the fold with its mouth directed upwardly to receive the bottom edge of the fold.

References Cited by the Examiner

UNITED STATES PATENTS

| | | | |
|---|---|---|---|
| 2,447,542 | 8/1948 | Seward | 108—53 |
| 2,463,588 | 3/1949 | Arthur | 108—52 |
| 2,492,626 | 12/1949 | Fletcher | 108—58 |
| 2,605,070 | 7/1952 | Fletcher | 108—51 |
| 2,710,160 | 6/1955 | Bitney | 108—51 |
| 3,120,825 | 2/1964 | Johnson | 108—51 |
| 3,167,341 | 1/1965 | Higgins | 108—58 X |

FRANK B. SHERRY, *Primary Examiner.*